Patented Aug. 28, 1945

2,383,922

UNITED STATES PATENT OFFICE 2,383,922

DEPOLYMERIZATION OF POLYMERS OF STYRENE AND RING SUBSTITUTED METHYL STYRENES

Frank J. Soday, Swarthmore, Pa., assignor to The United Gas Improvement Company, a corporation of Pennsylvania No Drawing. Application February 13, 1942, Serial No. 430,717

14 Claims. (Cl. 260—669)

This invention pertains generally to the depolymerization of polymers of styrene and ring substituted methyl styrenes.

An object of the present invention is the isolation of a mixture of monomeric styrene and one or more monomeric ring substituted methyl styrenes, in the form of a mixture with a polymerizable solvent, from a fraction or solution containing styrene and ring substituted methyl styrene by subjecting said fraction or solution to polymerizing conditions, substituting a polymerizable solvent or mixture of polymerizable solvents for the unpolymerized material present, and thereafter depolymerizing the mixed polymers.

Another object of the invention is the isolation of a mixture of monomeric styrene and one or more monomeric ring substituted methyl styrenes, in the form of a mixture with a polymerizable solvent or solvents, from the still residues commonly obtained as a by-product of the distillation and/or fractionation of fractions or solutions containing styrene and one or more ring substituted methyl styrenes by substituting a polymerizable solvent or mixture of polymerizable solvents for the unpolymerized material present, and thereafter depolymerizing the polymers present such as by the application of heat.

A further object of the invention is the depolymerization of polymers and/or copolymers obtained from a mixture of styrene and one or more ring substituted methyl styrenes by the application of heat to a solution in a polymerizable solvent of said polymers and/or copolymers when in the form of a thin layer or film.

Another object of the invention is the depolymerization of a solution in a polymerizable solvent of such polymers and/or copolymers by the application of heat thereto when in finely divided form.

A further object of the invention is the isolation of a mixture of monomeric styrene and one or more monomeric methyl styrenes, in the form of a mixture with a polymerizable solvent or solvents, from styrene-methyl styrene polymers and/or copolymers in general, including scrap styrenemethyl styrene polymers and/or copolymers, such as, for example, the gates, sprues and other by-products obtained upon molding, casting, extruding, machining, or otherwise handling or working said materials by dissolving or dispersing such polymers and/or copolymers in a polymerizable solvent, or mixture of polymerizable solvents, and thereafter depolymerizing said material by the application of heat.

Other objects and advantages of the invention will be apparent to those skilled in the art from an inspection of the following specification and claims.

For convenience in description, the term "methyl styrene" or "methyl styrenes" as used throughout the specification is intended to embrace one or more ring substituted methyl styrenes such as ortho methyl styrene, meta methyl styrene, and para methyl styrene, although the presence of side chain substituted styrenes and particularly side chain substituted methyl styrenes is not precluded as will hereinafter appear.

My present invention involves depolymerizing styrene-methyl styrene copolymer with or without the presence of styrene polymer and/or methyl styrene polymer or of depolymerizing mixtures of styrene polymer with methyl styrene polymer. The methyl styrene polymer may be present in the form of homopolymers of the individual methyl styrenes and/or in the form of copolymers thereof.

The fractions or solutions constituting one preferred source of my starting material contain substantial quantities of both styrene and methyl styrene, so that upon polymerization of such fractions or solutions the monomeric components theref may form not only copolymer or copolymers of styrene and one or more methyl styrenes, but also homopolymer or homopolymers of one or more of the monomeric components, and/or copolymers of two or more methyl styrenes.

The extent to which one or more homopolymers and/or methyl styrene copolymers are formed together with copolymer of styrene and methyl styrene in any given instance may depend upon a number of factors at present not entirely understood, such as the ratio to each other of the monomeric constituents present in the fraction or solution, the nature and quantity of impurities present, the polymerizing conditions such as temperature, type of catalyst, if any, etc., and perhaps other factors.

A "homopolymer" may be said to be a polymerization product resulting from the combination of molecules of monomer and/or polymers of the same monomeric polymerizable compound.

A "copolymer," on the other hand, may be defined as a polymerization product resulting from the combination of molecules of monomers and/or polymers of at least two different monomeric polymerizable compounds.

For convenience in the specification and claims, I employ the term "styrene-methyl styrene polymer" and its variants, unless otherwise qualified, to embrace any polymerization mass resulting from the polymerization of a mixture of styrene and one or more ring substituted methyl styrenes.

In the various processes which have been developed for the manufacture of artificial gas, such as oil gas, carburetted water gas, or coal gas, considerable quantities of tar are produced, and the gas contains substantial quantities of other readily condensible materials.

The condensate obtained from the artificial gas, as well as the light oil obtained upon distillation of the tar, constitute sources for many unsaturated and aromatic hydrocarbons. The light oil obtained from the pyrolysis of petroleum or of petroleum hydrocarbons is especially rich in unsaturated hydrocarbons, particularly when temperatures in excess of 1100° F. have been employed in the cracking operations.

Among these unsaturated hydrocarbons are styrene and the following methyl styrenes,

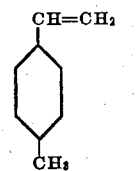
p-Methyl styrene

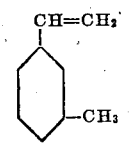
m-Methyl styrene

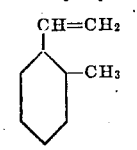
o-Methyl styrene

Although the light oil from which styrene and methyl styrene may be isolated has been available in commercial quantities for several decades, until recently no satisfactory processes have been developed for the utilization of these materials sufficiently promising to warrant commercial exploitation. The so-called crude light naphtha in which they occur has been used generally for the production of resins of inferior quality and dark color, as a cutback for tar or asphalt, or for fuel purposes.

I have discovered that the styrene and methyl styrene present in fractions or solutions containing styrene and methyl styrene may be isolated, in the form of a solution in a polymerizable solvent, by the polymerization of the said fraction or solution, or mixtures thereof, substituting a polymerizable solvent or mixture of polymerizable solvents for the unpolymerized material present, and depolymerizing the styrene-methyl styrene polymers contained in the resulting mixture by the application of elevated temperatures, and preferably while the mixture is in attenuated form.

As polymerizable solvents, I prefer to employ materials containing at least one double bond and capable of being polymerized by the application of heat and/or catalysts. As examples of such polymerizable solvents, I may employ styrene; substituted styrenes, including alkyl, aryl, alkyl-aryl, aryl-alkyl, halogen, and/or other substituted styrenes, such as, for example, o-methyl styrene, m-methyl styrene, and/or p-methyl styrene; olefines in general, whether substituted or not, such as isobutylene, vinyl naphthalene, and vinyl carbazole; diolefines, whether substituted or not, such as, for example, butadiene, isoprene, piperylene, cyclopentadiene, 2-chloro-butadiene-1,3, and the like; acrylic acid, derivatives of acrylic acid and/or substituted acrylic acids, such as, for example, methyl acrylate, acrylic nitrile, and the like; methacrylic acid, derivatives of methacrylic acid and/or substitutes methacrylic acids, such as, for example, methyl methacrylate, ethyl methacrylate, and the like; substituted vinyl derivatives, such as, for example, vinyl chloride, vinyl acetate, and the like; vinylidene derivatives, such as, for example, vinylidene chloride; maleic anhydride and derivatives and substitutes thereof; other compounds containing at least one polymerizable double bond; and mixtures containing two or more of the foregoing.

In general, the foregoing compounds may be represented by the following structural formula

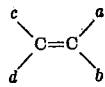

in which $a$, $b$, $c$, and $d$ are selected from the class consisting of the following: hydrogen, alkyl, unsaturated alkyl, substituted alkyl, unsaturated substituted alkyl, aryl, substituted aryl, unsaturated aryl, unsaturated substituted aryl, alkyl-aryl, substituted alkyl-aryl, unsaturated alkyl-aryl, substituted unsaturated alkyl-aryl, aryl-alkyl, substituted aryl-alkyl, unsaturated aryl-alkyl, substituted unsaturated aryl-alkyl, hydrocarbon groups, residues, and radicals in general, whether substituted and/or unsaturated or not, such as naphthenic, superaromatic, heterocyclic, and other groups, —COOH, —COOR$_1$, where R$_1$ may be alkyl, aryl, aryl-alkyl, alkyl-aryl, hydrocarbon groups, residues, and radicals in general, whether substituted and/or unsaturated or not, —CN, —Cl, —Br, —F, —I, —HSO$_4$, —OH, —OR$_1$, where R$_1$ may alkyl, aryl, aryl-alkyl, alkyl-aryl, hydrocarbon groups, residues, and radicals in general, whether substituted and/or unsaturated or not, —COCl, and the like.

Due consideration should be given to the solubility of the styrene-methyl styrene polymers in different types of polymerizable solvents in selecting a polymerizable solvent, or mixture of polymerizable solvents, for this purpose. Thus, for example, a polymerizable solvent containing one or more aromatic rings usually will be found to dissolve the styrene-methyl styrene polymers readily.

A preferred embodiment of this invention is the use of monomeric styrene and/or monomeric substituted styrenes corresponding to the following general formula

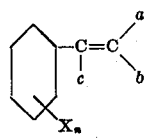

where $a$, $b$, and $c$ are selected from the class consisting of hydrogen, alkyl, aryl, alkyl-aryl, and aryl-alkyl groups, whether substituted or not, alkene, alkene-aryl, aryl-alkene, halogen, —CN, —COOH, —COOR$_2$, —HSO$_4$, —OH, and OR$_2$, where R$_2$ represents alkyl, aryl, alkyl-aryl, and aryl-alkyl groups whether substituted or not, alkene, alkene-aryl, aryl-alkene; X is selected from the class consisting of alkyl, aryl, alkyl-aryl, and aryl-alkyl groups, whether substituted or not, alkene, alkene-aryl, aryl-alkene; and $n$ represents the fact that there may be none or up to five substituents on the benzene ring, as a solvent or solvents for the mixture of styrene-methyl styrene polymers prior to the depolymerization thereof.

The use of styrene for this purpose, as well as certain substituted styrenes, such as, for example o-methyl styrene, m-methyl styrene, and p-methyl styrene, and particularly mixtures of such substituted styrenes, gives unusually satisfactory results.

It is to be understood, of course, that the foregoing monomeric polymerizable solvents, or mixtures thereof, may contain some polymers prior to their use as solvents for styrene-methyl styrene polymers, and that some of the said monomeric materials may polymerize to some extent during the process of dissolving or dispersing the polymers in the polymerizable solvent or mixture of solvents, or of displacing or replacing the unpolymerized material present in a polymerized styrene-methyl styrene fraction or solution with a polymerizable solvent having a higher boiling point. Certain of these polymers may depolymerize, at least in part, to form the corresponding monomeric compounds during the subsequent depolymerizing step.

Any undepolymerized portion of such polymers will, in most cases, be isolated in the residues accumulated in the depolymerizing unit, together with any undepolymerized portion of the styrene-methyl styrene polymers.

In addition, one or more saturated or unpolymerizable solvents also may be used in conjunction with a polymerizable solvent, or mixture of such solvents, as a solvent for styrene-methyl styrene polymers prior to their depolymerization. In such cases, the unpolymerizable solvent preferably has a different boiling point or range from that of styrene and methyl styrene, as well as the polymerizable solvent or solvents present, in order that it may be readily separable therefrom, if desired. However, I generally prefer to employ polymerizable solvents only in the practice of my invention.

It may be found desirable in certain cases to incorporate a polymerization inhibitor in the polymerizable solvent prior to or during the process of dissolving the styrene-methyl styrene polymers in the polymerizable solvent, or prior to or during the depolymerization of the said polymers dissolved in a polymerizable solvent, in order to prevent any substantial polymerization of the said solvent. An example of such an inhibitor is hydroquinone. In case the added inhibitor is somewhat volatile, the mixture of monomeric styrene, methyl styrene, and polymerizable solvent obtained from the process may be treated to remove any inhibitor present, if desired, such as by washing with an alkaline solution or otherwise, if desired.

Certain relatively high-boiling volatile materials, such as plasticizers, softening agents, and the like, also may be incorporated in the solution of styrene-methyl styrene polymers in a polymerizable solvent at any stage prior to, or during the depolymerization of the said polymers. Such materials are isolated with the mixture of styrene, methyl styrene, and polymerizable solvent and may be incorporated subsequently in any polymer or copolymer prepared therefrom, if desired, by polymerizing the said mixture of styrene, methyl styrene, and/or polymerizable solvent, in the presence of the relatively high-boiling volatile material.

As pointed out previously, the process disclosed herein is particularly well adapted to the isolation of monomeric styrene and one or more monomeric methyl styrenes, in the form of a mixture with one or more polymerizable solvents, from light oil fractions containing the same, such for example, as the light oils obtained by the destructive distillation of carbonaceous material, such as petroleum, other oils, coal, and similar materials. The light oil obtained by the pyrolysis of petroleum at temperatures in excess of 1100° F., such as, for example, in the various processes developed for the production of oil gas or carburetted water gas from petroleum, is an especially desirable source of such styrene-methyl styrene fractions.

As a result of extensive experimentation, I have found that light oil fractions derived from oil gas and boiling within the range of approximately 130° C. to 180° C. contain substantial quantities of styrene and methyl styrenes. Thus, for example, the predominating unsaturated hydrocarbons present in light oil fractions boiling in the range of 130° to 180° C., and more particularly in the range of 135° to 175° C., usually are styrene, para-methyl styrene and meta-methyl styrene.

The process disclosed herein for the isolation of styrene and methyl styrene from light oil fractions containing the same comprises polymerizing the said fraction, or solution, substituting a polymerizable solvent or mixture of polymerizable solvents for the unpolymerized material present, and depolymerizing the styrene-methyl styrene polymer solution by the application of heat.

The initial step in the isolation of styrene and methyl styrene, in the form of a mixture with one or more polymerizable solvents, from fractions or solutions containing the same, namely, the polymerization of such fractions or solutions, may be carried out in any desired manner.

Thus, for example, such fractions may be polymerized by the application of heat. In general, an increase in temperature during such polymerizing processes results in a corresponding decrease in the time required to convert the styrene and methyl styrene present to polymers and a decrease in the molecular weight of such polymers. As the low molecular weight polymers can be handled somewhat more easily in the depolymerizing processes described herein, due to their friable nature and the relative ease with which they may be dissolved in certain polymerizable solvents, a preferred embodiment of this invention is the use of such low molecular weight polymers in such processes.

Thus, for example, light oil styrene-methyl styrene fractions boiling in the range of 130° to 180° C. may be polymerized by the application of temperatures in the range of, say, 150° to 200° C., or higher, for periods ranging from one to four days, for example, to give excellent yields of polymers which have a low molecular weight, are friable and may be dissolved readily in certain solvents of the type described herein.

A friable polymer may be distinguished from a tough polymer in that the former cannot be readily molded without fracture whereas the latter can be very readily molded without fracture. In general a friable polymer may also be distinguished from a tough polymer in that it has a relatively low melting point, for example below 150° C. by the capillary method.

Generally speaking, however, any desired polymerizing schedule may be employed and the polymerization may be carried out at any desired pressure, whether atmospheric or above or below, and in the presence of any desired gaseous substance, such as air, nitrogen, carbon dioxide, and the like.

In addition, catalysts may be used for the polymerization of such fractions, either alone or in combination with the simultaneous, or otherwise, application of heat. Examples of such catalysts are peroxides, such as hydrogen peroxide, benzoyl peroxide, stearyl peroxide, and the like; contact materials such as clay, activated clay, carbon, activated carbon, silica gel, alumina, and the like; metallic halides and metallic halide-organic solvent complexes, and especially those which are characterized by readily hydrolyzing in the presence of water to give an acid reaction, such as aluminum chloride, boron trifluoride, aluminum chloride-diethyl ether complex, boron trifluoride-diethyl ether complex, and the like; ansolvo acids such as borofluoroacetic acid; mineral acids and mineral acid-organic solvent mixtures or reaction products, such as sulfuric acid and sulfuric acid-diethyl ether mixture; reactive metals such as sodium; and other catalysts or mixtures thereof.

After polymerization, such catalysts preferably are removed from the polymers prior to their depolymerization by the methods to be more particularly described herein. In the case of contact materials, such catalysts usually can be readily removed from the polymer solution by filtration or centrifuging. In the case of metallic halides and complexes thereof, ansolvo acids, and mineral acids, such acid-acting catalysts preferably are hydrolyzed or neutralized by the addition of an alkali or an aqueous solution of an alkali, followed by filtration or centrifuging to remove the hydrolysis products. Reactive metals may be removed by the addition of alcohol, followed by filtration.

Other methods of removing the catalysts employed in such processes may be used, if desired.

By the use of catalysts in conjunction with the use of elevated temperatures, polymers possessing almost any desired physical properties may be obtained. In addition, the complete conversion of the styrene and methyl styrene present in a given fraction or solution may be accomplished in a minimum of time by the use of certain of the catalysts described in combination with the use of elevated temperatures.

The styrene and methyl styrene present in a given fraction or solution may be converted to polymers possessing very low melting points by the use of certain catalysts in conjunction with the application of elevated temperatures. Thus, the polymerization of a light oil styrene-methyl styrene fraction with activated clay at elevated temperatures resulted in the production of a polymer which was liquid at room temperatures. The use of such low melting or liquid polymers may be desirable in certain of the depolymerizing processes described herein, as will be more fully explained hereinafter.

By the use of rigorous polymerizing methods, very low molecular weight products may be obtained from styrene-methyl styrene fractions or solutions. The low molecular weight polymers of this type may be used in the depolymerizing processes of the type described herein.

In general, it may be said that the use of elevated temperatures for the polymerization of styrene-methyl styrene fractions is preferred.

As has previously been pointed out, the polymerization step as applied to fractions or solutions containing substantial quantities of both styrene and methyl styrene may result in the production of styrene-methyl styrene copolymer, homopolymer of any one or more of the monomeric components present, and/or copolymer of the methyl styrenes themselves.

Irrespective of the method employed in polymerizing the styrene-methyl styrene fraction or solution, it is followed by the removal of the unpolymerized material present. This can be carried out in any desired manner. Thus, for example, the polymer solution may be distilled, preferably under reduced pressure and/or the application of superheated steam, until all of the unpolymerized material has been removed.

Other methods of isolating the polymer may be used, if desired. Thus, for example, the polymer may be precipitated from its solution in the unpolymerized materials present by the addition of a non-solvent for the polymer therein, such as alcohol. The precipitated polymer then may be further processed to remove unpolymerized material, if desired, such as by working it on heated rolls, or otherwise.

The polymer solution also may be processed to remove unpolymerized material, among other ways, by spray drying methods such as by spraying the polymer solution into a heated tower, either alone or in conjunction with the use of steam or an inert gas to assist in removing the unpolymerized material, by working the material on hot rolls to remove unpolymerized material, or by other methods.

It is preferred that all, or substantially all, of the unpolymerized material present in such polymer solutions be removed from the polymer prior to the depolymerization of said polymer Otherwise, such unpolymerized materials may contaminate the mixture of styrene, methyl styrene, and polymerizable solvent obtained from the depolymerizing process.

An entirely unexpected advantage derived from the use of the process described herein for the depolymerization of styrene-methyl styrene polymers is the removal of impurities commonly associated with any impure styrene-methyl styrene fraction employed. Thus, for example, light oil styrene-methyl styrene fractions commonly contain substantial quantities of phenyl acetylene, methyl phenyl acetylene, colored compounds, and color-forming compounds, all of which preferably are substantially completely removed from the styrene-methyl styrene mixture so that a polymer thereof having acceptable physical properties is assured.

I have discovered that such compounds are substantially completely, or completely, removed from impure styrene-methyl styrene fractions or solutions, such as light oil styrene-methyl styrene fractions, during my process described herein in most if not all cases, resulting in the production of a mixture of monomeric styrene, methyl styrene, and polymerizable solvent substantially completely free from such undesirable compounds Polymerizable solvents having any desired boiling point or range may be used to dissolve styrene-methyl styrene polymers prior to their depolymerization. Somewhat different procedures may be employed in substituting the desired polymerizable solvent, or mixture thereof, for the unpolymerized material present in the polymerized styrene-methyl styrene fraction depending, among other things, upon the boiling point or boiling range of the polymerizable solvent or mixture of polymerizable solvents employed for this purpose.

Thus, when a polymerizable solvent having a boiling point or range substantially above that of methyl styrene is used, the polymerizable solvent or mixture of polymerizable solvents may be added to the polymerized styrene-methyl styrene fraction prior to the removal of the unpolymerized material therefrom, after which the unpolymerized material originally present in the styrene-methyl styrene fraction may be removed by any desired method, such as by distillation and/or fractionation, resulting in a solution of styrene-methyl styrene polymers in the desired polymerizable solvent, or mixture of polymerizable solvents.

In the case of a polymerizable solvent, or mixture of polymerizable solvents, having a boiling point or boiling range similar to, identical with, or below the boiling point of styrene, the styrene-methyl styrene polymers preferably are isolated from the unpolymerized material present in the polymerized styrene-methyl styrene fraction prior to the addition thereto of such polymerizable solvents. Suitable methods for the isolation of the styrene-methyl styrene polymers have been discussed previously.

This latter method, of course, applies also to polymerizable solvents having a boiling point or range substantially above that of any of the methyl styrenes. It also applies to the preparation of solutions of styrene-methyl styrene polymer in a mixture of polymerizable solvents having boiling points both above that of the monomeric methyl styrenes and below that of monomeric styrene.

What has been said with respect to the isolation of monomeric styrene and methyl styrene in the form of a mixture with one or more polymerizable solvents, from styrene-methyl styrene fractions applies also to styrene-methyl styrene fractions or solutions in general. Thus, for example, solutions of monomeric styrene and monomeric methyl styrene in other compounds, such as, for example, styrene-methyl styrene fractions or solutions obtained upon the dehydrogenation of a mixture of ethyl benzene and methyl ethyl benzenes, the dehydration of a mixture of phenylethyl alcohol and methyl phenylethyl alcohols, the decomposition of mixtures of cinnamic acid and methyl cinnamic acids, and from other sources, may be isolated, in the form of a mixture with one or more polymerizable solvents, according to the method described herein with excellent results. However, the problem of purification is almost infinitely greater with light oil fractions due, among other things, to the presence of a wide variety of impurities in the latter fractions.

Fractions or solutions containing almost any desired proportions of styrene and methyl styrenes may be used in the processes described herein. Thus, fractions containing as little as 1% of styrene and methyl styrene may be polymerized, a polymerizable solvent or solvents substituted for the unpolymerized material present, and the resulting solution or mixture depolymerized to form styrene and methyl styrene in admixture with polymerizable solvent. However, I generally prefer to use fractions containing somewhat larger quantities of styrene and methyl styrene, say 10% or more, for economic reasons. Fractions or solutions containing 20%, or more, of styrene and methyl styrene, such as 40% to 80% or higher, are particularly desirable for this purpose. It will be understood that the foregoing percentage figures refer to concentrations of styrene and methyl styrene combined.

In addition to the use of polymers prepared directly by the polymerization of fractions or solutions containing both styrene and methyl styrene, styrene-methyl styrene polymers obtained from other sources also may be depolymerized by the process described herein to form a mixture of monomeric styrene, monomeric methyl styrene and one or more polymerizable solvents with excellent results.

A very satisfactory source for such polymers is the still bottoms or residues obtained as a by-product of the fractionation of solutions or fractions containing styrene and methyl styrene. Thus, for example, light oil obtained from oil gas, or from other sources, commonly is fractionated to obtain fractions containing substantial proportions of styrene and methyl styrene among other unsaturated hydrocarbons. Such fractionating steps result in the production of considerable quantities of polymers from the styrene and methyl styrene present in such fractions, particularly when drastic fractionating methods are employed for the production of fractions containing substantial quantities of styrene and methyl styrene. The still residues obtained from such processes are particularly well adapted to the production of styrene and methyl styrene by the depolymerizing methods described herein.

As such still residues are commonly drained from the still pot or reboiler, either continuously or discontinuously, before all of the unpolymerized material has been distilled therefrom in order to assist in the removal of the still residues from the unit, such materials preferably are treated to remove all unpolymerized material present prior to the depolymerization of the styrene-methyl styrene polymers. The methods discussed previously for the removal of unpolymerized material from polymerized styrene-methyl styrene fractions or solutions may be used for this purpose with excellent results.

If desired, the still residues may be subjected to treatment, such as by the application of elevated temperatures and/or catalysts, in order to polymerize a part or all of the styrene and methyl styrene present prior to substituting a polymerizable solvent or solvents for the unpolymerized material present.

In addition to still residues, styrene-methyl styrene polymers derived from the polymerization of styrene-methyl styrene fractions or solutions under other conditions, such as the polymers obtained when such fractions or solutions are stored, shipped, or otherwise handled or treated, also may be used for the production of styrene and methyl styrene according to the methods described herein.

Styrene-methyl styrene polymers derived from any source, such as, for example, scrap or rejected styrene-methyl styrene polymers including sprues, gates, flashing and miscellaneous scrap resulting from molding, casting, extruding, machining, and/or other handling, forming, and/or finishing operations, and off-grade or off-color styrene-methyl styrene polymers in general, may be used in the process disclosed herein.

In addition to the foregoing, copolymers and/or mixed polymers of styrene and methyl styrene with other polymerizable materials may be depolymerized according to the method disclosed herein. Thus, for example, copolymers and/or mixed polymers of styrene and one or more methyl styrenes with polymerizable compounds such as acrylic acid, derivatives and/or substituents of acrylic acid, methacrylic acid, derivatives and/or substituents of methacrylic acid, vinyl derivatives such as vinyl chloride and vinyl acetate, vinylidene derivatives, diolefines, olefines, and mixtures containing two or more of the foregoing, as well as copolymers and/or mixed polymers of styrene and methyl styrene with other polymerizable materials, may be used in the processes disclosed herein.

The depolymerized material thus obtained usually comprises a mixture of the added polymerizable solvent, methyl styrene, and styrene, together with, the other constituent or constituents of the copolymer and/or mixed polymer. Such mixture may be treated to recover styrene and one or more methyl styrenes by any suitable means if desired, such as by fractional distillation, suitably under reduced pressure. In this way monomeric styrene and one or more monomeric methyl styrenes in good yields may be recovered, as well as good yields of the monomeric compound or compounds which were present in the form of copolymer and/or mixed polymers. The monomeric components thus obtained from the copolymer and/or mixed polymers may be obtained in the form of mixtures or solutions with the polymerizable solvent or solvents employed in the depolymerization, and these mixtures may be used as such for any desired purpose, or where desired and when practicable they may be further treated in order to separate or partially separate the components thereof.

The solutions of styrene-methyl styrene polymers or resins, suitably dissolved in polymerizable solvents of the type described herein, may be introduced into the depolymerizing units to be described presently in any desired form. As pointed out previously in discussing the polymerization of styrene-methyl styrene fractions or solutions, the polymers obtained may be in the form of high, medium or low-melting polymers, or even liquid polymers. Low melting polymers are well adapted for use in the depolymerizing processes disclosed herein.

Thus, a mixture of polymerizable solvent and polymers may be melted by the application of heat. By the use of this method, relatively small quantities of polymerizable solvent and moderate temperatures may be employed in the production of a liquid mixture to be introduced into the depolymerizing unit. This may be advantageous in certain cases, particularly when it is desired to produce a mixture containing a low ratio of polymerizable solvent to combine styrene and methyl styrene.

However, I generally prefer to use polymer solutions which are liquid at room temperature as such solutions may be handled with less difficulty than solutions containing less polymerizable solvent.

The depolymerization of the foregoing solutions of styrene-methyl styrene polymers may be carried out in the presence or absence of certain other diluents in the reaction zone, such as steam, saturated or non-polymerizable solvents, particularly relatively low boiling non-polymerizable solvents, such as propane, butane, pentane, petroleum ether, benzene, and toluene. and inert gases, such as nitrogen, carbon dioxide, stack gases, and the like. These diluents may be heated or superheated prior to their introduction into the reaction zone, in which case they may be used as the sole source of heat in the reaction zone, or they may be used in conjunction with the external application of heat thereto, or otherwise.

In general, I prefer to carry out the depolymerization in the substantial absence of non-polymerizable solvents, except low boiling non-polymerizable solvents, such as, for example, propane, butane, pentane, or petroleum ether.

The depolymerizing operations may be carried out at atmospheric, sub-atmospheric, or super-atmospheric pressures. In general, atmospheric or sub-atmospheric pressures are preferred.

As the majority of the styrene-methyl styrene polymers are stable at temperatures below 300–350° C., temperatures above this range normally should be employed in order to obtain satisfactory yields of styrene and methyl styrene within a reasonable period of time. I have found that the use of temperatures above 400° C. and, particularly, above 500° C., are very satisfactory for the production of styrene and methyl styrene according to the methods described herein. Temperatures above 600° C. give excellent yields.

The desired solution of polymers in one or more polymerizable solvents may be charged to the reaction zone by any desired method. Thus, for example, the polymer solution may be pumped into the reaction zone, or it may be forced into the reaction zone by the application of pressure, or it may be drawn into the reaction zone by reducing the pressure therein, or otherwise. The container, pipe, tubes, valves, pumps, and other devices and equipment used to store the polymer solution prior to its delivery to the reaction zone, and to deliver it to the reaction zone at the desired rate, may be heated by any desired method to insure that the polymer is maintained at the desired temperature, if desired. This may be accomplished, among other ways, by providing such items of equipment with suitable jackets or coils through which steam or any other desired heating medium may be passed, or by the use of electrical resistance heaters for this purpose, or otherwise.

The polymer solution may be heated to any desired temperature prior to its introduction into the reaction zone, if desired. Thus, for example, it may be heated to an incipient decomposition temperature, or almost to this point, before being introduced into the reaction zone. In case a relatively low boiling solvent is present, the polymer-solvent mixture may be heated under a pressure sufficient to maintain the solvent in the liquid state at the chosen temperature prior to its introduction into the reaction zone.

An alternative method of introducing the polymer solution to the reaction zone comprises carbureting it with steam, a solvent or other liquid in the vapor state, an inert gas, or other suitable agent. This method is especially applicable to solutions of relatively low-melting polymers possessing an appreciable vapor pressure at temperatures below their initial depolymerizing temperature. Thus, for example, a solution of a liquid styrene-methyl styrene polymer in a polymerizable solvent may be heated to a temperature of, say, 200° C. in a suitable vessel. A suitable carbureting medium such as, for example, superheated steam is passed through the heated liquid polymer solution, the mixture of steam and carburetted polymer solution then being delivered to the reaction zone. By a suitable control of the type of polymer solution employed, the temperature to which it has been heated, and the temperature of the steam employed for carbureting purposes, almost any desired ratio of steam and polymer solution may be delivered to the reaction zone.

Fairly high boiling polymerizable solvents, such as vinyl naphthalene, preferably should be employed for this purpose and/or the solvent present in the carburetor replenished from time to time. A relatively low melting type of polymer and/or copolymer also is preferably employed. Otherwise, the polymerizable solvent may be removed completely from the carburetor before all of the styrene-methyl styrene polymer has been charged to the unit.

In the foregoing methods, the polymer solution may be delivered to the reaction zone in the form of a thin layer or stream, or in the form of a spray or mist of finely divided particles, depending, upon other things, upon the type of fitting employed at the termination of the delivery pipe or other device in the reaction zone.

As pointed out previously, I have discovered that solutions of styrene-methyl styrene polymers in polymerizable solvents may be readily depolymerized to give good yields of monomeric styrene and methyl styrene, in the form of a mixture in a polymerizable solvent, by the application of heat to only a limited quantity of such polymer solutions at any given time. Any suitable procedure capable of meeting these conditions may be used for the depolymerization of solutions of styrene-methyl styrene polymers in polymerizable solvents.

Thus, for example, the polymer solution may be introduced into a heated vessel provided with a stirring device conforming to the interior thereof and sufficiently close to the sides of the vessel to prevent any undue accumulation of material thereon. In general, vessels of this type provided with a stirrer or scraping device extending over the major portion of the interior surface of such vessels, particularly the lower portion thereof in the case of vertical vessels, are well adapted to the production of monomeric styrene and monomeric methyl styrene in admixture with a polymerizable solvent, in good yields from solutions of their polymers in polymerizable solvents by thermal depolymerization. In general, the clearance between the heated walls of such vessels and the agitator or scraper should preferably be less than $\frac{1}{4}''$ and, more preferably, less than $\frac{1}{8}''$. Excellent results may be obtained when the clearance between the two surfaces is $\frac{1}{16}''$ or less, and the optimum results are obtained when the agitator or scraper actually scrapes the interior surface of the reaction vessel. Thus, for example, vessels of the type commonly employed in the petroleum industry for blending or compounding greases, and in which the agitator scrapes the rounded bottom and the lower portions of the sides of the reaction vessel, are well adapted to the preparation of styrene and methyl styrene by the thermal depolymerization of solutions of polymers thereof in polymerizable solvents. The resin solution is distributed on the bottom and sides of the reactor by means of the agitator blade, the rate of flow of the resin solution and the depolymerization temperature usually being so regulated that only a thin film of resin solution is present on the bottom and sides of the reaction vessel at any given period of time.

Another suitable method for the depolymerization of styrene-methyl styrene polymers dissolved or dispersed in one or more polymerizable solvents comprises contacting such polymer solutions in a reaction vessel with a molten metal, alloy, salt, mixture of salts, or other liquids capable of withstanding relatively high temperatures without appreciable decomposition.

The polymer solution may be delivered to the interior of the reaction vessel in any desired form, such as in the form of a thin stream, ribbon, or spray by the use of suitable constrictions or devices on the lower end of the charging tube. Likewise, the polymer solution may be delivered above or below the level of the molten heating material in the unit. The polymer solution may be delivered to the unit as such, or in combination with one or more assisting agents such as steam, nonpolymerizing solvents, gases or the like.

In addition, such assisting agents may be added to the reaction vessel, the rate of flow of such agent or agents being regulated by means of a valve or other device. These agents also may be delivered above or below the level of the molten heating material in the unit.

During the operation of the unit, the molten metal or other material may be agitated to any desired extent, although such agitation is not necessary in all cases. The unit may be opened from time to time to remove any residual material present, or the molten metal may be removed, skimmed, and returned to the unit, either continuously, discontinuously, or otherwise. As a general rule, very little, if any, carbonaceous residues or other undesirable solid by-products are generated in the process due to the excellent contact between the heating medium and the material to be depolymerized.

An excellent method for the depolymerization of styrene-methyl styrene polymers dissolved in one or more polymerizable solvents comprises the application of heat thereto while in a very finely divided form. Any desired method of subdividing the polymer solution may be employed, such as pumping or forcing the polymer solution through a suitable nozzle, orifice, constriction, or fitting designed to subdivide the stream into a relatively large number of small, discrete particles. Other methods of accomplishing this purpose may, of course, be used if desired. Thus, for example, the polymer solution may be pumped, flowed, or otherwise delivered to the top of a suitable tower or vessel and permitted to flow over a perforated plate or screen, or both, or otherwise, in such manner as to disperse the material in the form of very thin streams, or drops, or otherwise.

Another suitable method of depolymerizing styrene-methyl styrene polymers dissolved or dispersed in one or more polymerizable solvents is to pump, blow or otherwise force such solutions through a tubular unit possessing a fairly narrow cross-sectional area, preferably while the polymer solution is in a finely divided or vaporized form, or otherwise. A pipe coil, tube bundle, or conventional cracking furnace may be used for this purpose with excellent results.

The polymer solution may be charged to a single coil furnace, either alone or in admixture or in combination with steam, a non-polymerizable solvent, a gas, or a mixture thereof, the preheating and depolymerizing processes being carried out in the same coil. An alternative method comprises preheating the polymer solution, or admixture, in one coil, then delivering such preheated material to a second coil in which the depolymerization is affected either alone or in the presence of steam, a non-polymerizable solvent, or a gas, or a mixture thereof, which mixture may be added to the polymer solution at the inlet, or within, the second coil.

Another method comprises heating the assisting agent, such as steam, a non-polymerizable solvent, a gas, or a mixture thereof, in one coil, then delivering such heated assisting agent or agents to the second coil in conjunction with a stream of polymer solution, or a mixture of the polymer solution and steam, a non-polymerizable solvent, and/or a gas.

Other methods familiar to those engaged in the pyrolysis of petroleum may be used if desired. Other types of furnaces also may be employed, such as the de Florez furnace, a tube coil immersed in a molten metal bath, and the like.

In addition, the polymer solution or admixture may be charged to a conventional gas set, or a modification thereof, such as those employed for the production of blue gas, oil gas, carbureted water gas, and the like.

Other methods based upon heating a stream of finely divided styrene-methyl styrene polymer dissolved or dispersed in one or more polymerizable solvents, either alone or in conjunction with one or more assisting agents such as steam, another solvent, a gas, or a mixture thereof may be used, if desired.

It is to be understood, also, that any combination of the foregoing depolymerizing methods may be used for the production of styrene and methyl styrene.

The method of condensing and cooling the depolymerized, and other, materials obtained also is important from the standpoint of obtaining good yields. The vapors preferably should be condensed and cooled as rapidly as possible in order to prevent any recombination and to prevent side reactions from occurring to any substantial degree. This may be accomplished by conducting the vapors into an efficient condenser and cooling as quickly as possible, a satisfactory condenser for this purpose being a water cooled shell and tube condenser. The depolymerized materials also may be shock-cooled if desired, such as by injecting a spray or stream of water or other cooling medium directly into the depolymerized products obtained from the reaction zone, or by passing the depolymerized products through a wash box filled with water, or otherwise.

In general, it may be said that the best results are obtained when a solution of the polymer in a polymerizable solvent is depolymerized in the form of thin films or small discrete particles or streams in the shortest possible period of time, then condensing and cooling the polymerizable solvent and depolymerized products in the shortest possible period of time. Any undue increase in the depolymerizing time, or the time required to condense and cool the polymerizable solvent and depolymerized materials, may be reflected in decreased yields and in the presence of substantial quantities of higher boiling oils and other undesirable by-products in the styrene and methyl styrene.

The steam, non-polymerizable solvents, gases, or mixtures thereof, which may be charged to the depolymerizing unit with the polymer solution assist in the reaction in many ways. They may serve to transmit heat directly to the polymer solution, to assist in sweeping out the products of the depolymerization from the reaction zone in the shortest possible period of time, and to serve as diluting agents, thus preventing, or reducing the rate of, the combination of the polymerizable materials present.

As pointed out previously, also, the steam, non-polymerizable solvent vapors, gases, or mixtures thereof used as assisting agents in the depolymerization of solutions of styrene-methyl styrene polymers in polymerizable solvents may be preheated to any desired extent before being added to the said solution, or introduced into the reaction zone, or otherwise, and such agent or agents, may be used as the sole source of heat, if desired.

By the use of the foregoing methods for the depolymerization of solutions of styrene-methyl styrene polymers in one or more polymerizable solvents, all of which are based upon the principle of exposing a limited quantity of the said solution to elevated temperatures for a limited period of time under conditions designed to effect a rapid transfer of heat from the heating surface or medium to the said solution, removing the polymerizable solvent and depolymerized materials from the heating zone, and condensing and cooling them as rapidly as possible, excellent yields may be obtained.

The depolymerization is preferably carried out in a relatively short period of time. The application of elevated temperatures to solutions of styrene-methyl styrene polymers in polymerizable solvents for prolonged periods of time, such as may be encountered, for example, in batch depolymerizing methods, may result in the conversion of a relatively large proportion of such polymers into high boiling oils and similar undesirable impurities. In general, it may be said that the time of depolymerization is a function of the depolymerizing temperature employed. By the use of the proper type and size of unit, the contact time in the depolymerizing zone preferably rarely exceeds 10 minutes and, in most cases, will not exceed 5 minutes. Contact times substantially under 5 minutes and, more particularly, under 1 minute, will be found to give excellent results.

By depolymerizing solutions of styrene-methyl styrene polymers in polymerizable solvents, or mixtures of such solutions with other materials according to the method described, particularly when units of the type illustrated are used for this purpose, excellent yields of styrene and methyl styrene in admixture with one or more polymerizable solvents may be obtained.

Higher boiling oils and/or other undesirable by-products obtained during the depolymerization are readily separable therefrom by distillation in view of their widely different boiling points. Thus, for example, the depolymerization of styrene-methyl styrene polymers obtained from a light oil fraction boiling in the range of 135 to 178° C., in the form of a solution in one or more polymerizable solvents, may give yields up to 70 or 80% by weight of the original polymer, or even higher, when such polymers are depolymerized according to my invention.

The product obtained from the depolymerization of solutions of styrene-methyl styrene polymers in one or more polymerizable solvents, usually comprises a mixture of monomeric styrene, one or more monomeric methyl styrenes, and the polymerizable solvent, or solvents, employed.

Thus, when monomeric styrene has been used to dissolve the styrene-methyl styrene polymers prior to the depolymerization thereof, the product obtained comprises a mixture of monomeric styrene and one or more monomeric methyl styrenes. In case one or more of the methyl styrenes have been employed as the solvent for the styrene-methyl styrene polymers prior to their depolymerization, the product obtained also comprises a mixture of monomeric styrene and one or more monomeric methyl styrenes.

Small quantities of higher boiling oils, such as distyrene, dimeric methyl styrene, etc., also may be present in the products obtained. Such higher boiling oils may be readily separated from the monomeric products, such as by distillation and/or fractionation operations, or otherwise.

If desired, the monomeric styrene and monomeric methyl styrenes may be separated from each other, and from the polymerizable solvent, by any desired method, such as, for example, fractional distillation methods suitably under reduced pressure and in the presence of a polymerization inhibitor.

A preferred embodiment of this invention, however, is the preparation of co-polymers of the synthetic resin, synthetic rubber, or synthetic elastomer type, from the mixture of monomeric styrene, monomeric methyl styrene, and any other monomeric polymerizable solvents obtained from the process disclosed herein. Such copolymers may be prepared by the application of heat and/or catalysts to such mixtures, at atmospheric, sub-atmospheric, or superatmospheric pressures. Such copolymerizations also may be carried out in the emulsion state, if desired.

Thus, for example, when styrene or one or more methyl styrenes have been employed as solvents for the styrene-methyl styrene polymers prior to the depolymerization thereof, the resulting mixture of monomeric styrene and one or more methyl styrenes may be polymerized, such as by the application of heat, to give styrene-methyl styrene copolymers possessing excellent properties.

In a similar manner, copolymers of styrene and one or more methyl styrenes with one or more other polymerizable solvents, such as, for example, other substituted styrenes, olefines, substituted olefines, diolefines, substituted diolefines, acrylic acid, derivatives and/or substituents of acrylic acid, methacrylic acid, derivatives and/or substituents of methacrylic acid, vinyl derivatives, vinylidene derivatives, and the like, may be readily prepared by the use of such polymerizable solvents, or mixtures thereof, as solvents for styrene-methyl styrene polymers prior to the depolymerization thereof.

As pointed out previously, non-polymerizable solvents also may be added to the solution of styrene-methyl styrene polymers in a polymerizable solvent prior to or during the depolymerization thereof. In general, it may be said that such non-polymerizable solvents are removed from the mixture of styrene, methyl styrene, and any other polymerizable solvent prior to the polymerization, or other use, thereof.

A suitable method for separating the mixture of monomeric styrene, methyl styrene and any other polymerizable solvent from the non-polymerizable solvent present in the depolymerized products comprises the fractional distillation of such material. As styrene, methyl styrene, and the majority of the other polymerizable solvents are readily polymerized by the application of heat, such fractional distillation preferably is carried out under reduced pressure and in the presence of inhibitors, such as hydroquinone. The use of continuous fractionating columns for this purpose is particularly desirable. As pointed out previously, the methyl styrenes, if more than one is present in the product, may be separated from each other in the same manner, or otherwise, if desired.

Due to the ease with which styrene, methyl styrene and certain of the other polymerizable solvents may be polymerized by the application of heat, the use of non-polymerizable solvents having a boiling point substantially below that of styrene and/or the other polymerizable solvents present may result in a reduction of the quantity of polymers obtained during the fractionating operations. This is due to the fact that a fairly high reflux ratio may be employed in the early stages of the fractionation operations to effect a sharp separation between the non-polymerizable solvent and the styrene, methyl styrene and any other polymerizable solvent present and hence at a fairly low operating temperature. After the non-polymerizable solvent has been substantially completely removed, the mixture of styrene, methyl styrene, and any other polymerizable solvent may be distilled at a very low reflux ratio, or without the use of any reflux to separate it from the higher boiling by-products.

When a relatively high boiling non-polymerizable solvent has been employed in the process, a fairly high reflux ratio preferably is employed during the distillation of the styrene, methyl styrene, and any other polymerizable solvent in order to separate them from the higher boiling, non-polymerizable solvent and higher boiling by-products present. Under these conditions, a considerable quantity of styrene, methyl styrene, and any other polymerizable solvent may be converted to polymers and/or mixed polymers.

In general, it may be said that non-polymerizable solvents having boiling points below 135° C., and more preferably below 50° C., are preferred in cases where the use of a mixture of non-polymerizable solvent and a polymerizable solvent for styrene-methyl styrene polymers before the depolymerization thereof is indicated.

It is to be understood that higher boiling oils, if any, obtained in the process may be separated from the styrene and methyl styrene in admixture with a polymerizable solvent or solvents obtained therein prior to the use thereof by any desired method, such as for example by fractional distillation under reduced pressure.

In the practice of my invention substantially pure monomeric styrene and monomeric ring substituted methyl styrene may be recovered, by which it is intended to embrace styrene and one or more ring substituted methyl styrenes of at least 95% purity.

For the purposes of the specification and the claims the term "attenuated form" or its equivalent, unless otherwise modified, is intended to embrace sheet form, spray form, discrete particle form, small stream form, filament form, vapor form and similarly subdivided forms adapted for rapid heat transfer throughout the body of the material in process.

For the purpose of the specification and the claims, the term "styrene-methyl styrene fraction" is intended to include various polymerized forms thereof including copolymers and homopolymers, such as the still residues obtained upon the distillation of such fractions.

The term "polymerizable solvent" is intended to embrace organic solvents containing at least one double bond and capable of being polymerized by the application of heat and/or catalysts. Monomeric styrene and monomeric methyl styrenes are intended to be included in such classification.

While specific procedures for the depolymerization of styrene-methyl styrene polymers in the form of solutions in one or more polymerizable solvents have been particularly described, as well as the units in which such depolymerization may be conducted, it is to be understood that these are by way of illustration. Therefore, changes, omissions, additions, substitutions, and/or modifications may be made within the scope of the claims without departing from the spirit of the invention.

I claim:

1. A process for depolymerizing styrene-ring substituted methyl styrene-copolymer comprising admixing said copolymer with at least one added polymerizable solvent therefor containing at least one polymerizable double bond, and heating the resulting mixture of said styrene-ring substituted methyl styrene copolymer and said added polymerizable solvent under temperature conditions at least as high as 350° C. for a period of time sufficient to effect depolymerization but insufficient to cause the formation of a substantial quantity of high boiling oil, thereby effecting the depolymerization of said styrene-ring substituted methyl styrene copolymer under conditions of reduced concentration due to the presence of said added polymerizable solvent while recovering a product in which the concentration of polymerized material is increased by the presence of said added polymerizable solvent above that due to the presence of monomeric material resulting from said depolymerization of said styrene-ring substituted methyl styrene-copolymer.

2. A process for depolymerizing styrene-ring substituted methyl styrene copolymer comprising admixing said copolymer with at least one added polymerizable solvent therefor containing at least one polymerizable double bond, and heating the mixture of said copolymer and said added solvent in attenuated form under temperature conditions between 350° and 600° C. for a period of time sufficient to effect depolymerization but insufficient to cause the formation of a substantial quantity of high boiling oil, thereby effecting the depolymerization of said styrene-ring substituted methyl styrene copolymer under conditions of reduced concentration due to the presence of said added polymerizable solvent while recovering a product in which the concentration of polymerizable material is increased by the presence of said added polymerizable solvent to a concentration higher than that which would result from the presence of monomeric material produced by said depolymerization.

3. A process for producing monomeric unsaturated material containing styrene and monomeric ring substituted methyl styrene and suitable for polymerization from a mixture of styrene, ring substituted methyl styrene and unpolymerizable material contaminated with acetylene material selected from the group consisting of phenyl acetylene and methyl phenyl acetylene which comprises polymerizing said mixture; replacing unpolymerized material present with an added polymerizable solvent for the polymer containing at least one polymerizable double bond; heating the resulting solution under temperature conditions at least as high as 350° C. for a period of time sufficient to effect depolymerization but insufficient to cause the formation of a substantial quantity of high boiling oil; and recovering monomeric styrene and monomeric ring substituted methyl styrene in admixture with said added polymerizable solvent and substantially less contaminated with said acetylenic material.

4. A method for purifying styrene and ring substituted methyl styrene from methyl phenyl acetylene, said styrene and ring substituted methyl styrene being contained in a mixture with unpolymerizable material and contaminated with acetylenic material selected from the group consisting of phenyl acetylene and methyl phenyl acetylene which comprises polymerizing said mixture to produce a mixture of unpolymerized material and styrene-ring substituted methyl styrene copolymer; replacing said unpolymerized material with an added polymerizable solvent for said styrene-ring substituted methyl styrene copolymer containing at least one polymerizable double bond and containing at least one aromatic ring; heating the resulting solution in attenuated form under temperature conditions between 400° and 600° C. for a period of time sufficient to effect depolymerization but not exceeding five minutes; and recovering styrene and monomeric ring substituted methyl styrene produced by said depolymerization in admixture with said added polymerizable solvent and substantially less contaminated with said acetylene material.

5. A method for purifying styrene and ring substituted methyl styrene contained in a mixture with unpolymerizable material and contaminated with acetylenic material selected from the group consisting of phenyl acetylene and methyl phenylacetylene which comprises polymerizing said mixture to produce a mixture of unpolymerized material and polymerized styrene and polymerized ring substituted methyl styrene; replacing said unpolymerized material with an added solvent for said polymerized material containing monomeric ring substituted methyl styrene; heating the resulting solution of polymerized styrene and polymerized ring substituted methyl styrene polymer in added monomeric ring substituted methyl styrene in attenuated form under temperature conditions between 400 and 600° C. for a period of time sufficent to effect depolymerization but not exceeding five minutes; and recovering monomeric styrene and monomeric ring substituted methyl styrene produced by said depolymerization in admixture with said added monomeric ring substituted methyl styrene and substantially less contaminated with said acetylenic material.

6. A method for purifying styrene and ring substituted methyl styrene from acetylenic material selected from the group consisting of phenyl acetylene and methyl phenyl acetylene and for producing a mixture of monomeric styrene and monomeric ring substituted methyl styrene suitable for the production of styrene-ring substituted methyl styrene copolymer, said styrene and ring substituted methyl styrene being contained in a mixture with unpolymerizable material and contaminated with phenyl acetylene and methyl phenyl acetylene which comprises polymerizing said mixture to produce a mixture of unpolymerized material, polymerized styrene and polymerized ring substituted methyl styrene; replacing said unpolymerized material with an added solvent for said ring substituted methyl styrene polymer containing monomeric styrene; heating the resulting solution of polymerized styrene and polymerized ring substituted methyl styrene in said solvent in attenuated form under temperature conditions between 400° C. and 600° C. for a period of time sufficient to effect depolymerization but not exceeding five minutes; and recovering monomeric styrene and monomeric ring substituted methyl styrene produced by said depolymerization in admixture with said added monomeric styrene and substantially less contaminated with said acetylenic material.

7. A method for purifying styrene and ring substituted methyl styrene contained in a light oil styrene-ring substituted methyl styrene material contaminated with acetylenic material selected from the group consisting of phenyl acetylene and methyl phenyl acetylene which comprises polymerizing said light oil material to produce a mixture of unpolymerized material, and styrene-ring substituted methyl styrene copolymer; replacing said unpolymerized material with an added polymerizable solvent for said styrene and ring substituted methyl styrene polymer containing monomeric ring substituted methyl styrene; heating the resulting solution of styrene-ring substituted methyl styrene copolymer in added monomeric ring substituted methyl styrene in attenuated form under temperature conditions between 400 and 600° C. for a period of time sufficient to effect depolymerization but not exceeding five minutes; and recovering monomeric styrene and monomeric ring substituted methyl styrene produced by said depolymerization in admixture with said added monomeric ring substituted methyl styrene and substantially less contaminated with said acetylenic material.

8. A method for purifying styrene and ring substituted methyl styrene contained in a light oil styrene-ring substituted methyl styrene fraction from acetylenic material selected from the group consisting of phenyl acetylene and methyl phenyl acetylene also contained therein, and for producing a mixture of monomeric styrene and monomeric ring-substituted methyl styrene suitable for the production of styrene-ring substituted methyl styrene copolymer, which comprises polymerizing said fraction to produce a mixture of unpolymerized material and styrene-ring substituted methyl styrene copolymer; replacing said unpolymerized material with an added solvent for said styrene and ring substituted methyl styrene polymer containing monomeric styrene; heating the resulting solution of styrene-ring substituted methyl styrene copolymer in said solvent in attenuated form under temperature conditions between 400° and 600° C. for a period of time sufficient to effect depolymerization but not exceeding five minutes; and recovering monomeric styrene and monomeric ring substituted methyl styrene produced by said depolymerization in admixture with said added monomeric styrene and substantially less contaminated with phenyl acetylene and methyl phenyl acetylene.

9. A method for purifying styrene and ring substituted methyl styrene from acetylenic material selected from the group consisting of phenyl acetylene and methyl phenyl acetylene and for producing a mixture of monomeric styrene, monomeric ring substituted methyl styrene, and monomeric diolefinic material suitable for the production of copolymer of styrene and ring substituted methyl styrene with diolefinic material from a mixture of styrene and ring substituted methyl styrene with unpolymerizable material contaminated with said acetylenic material which comprises polymerizing said mixture to produce a mixture of unpolymerized material and styrene-ring substituted methyl styrene copolymer; replacing said unpolymerized material with an added polymerizable solvent for said polymer of styrene and ring substituted methyl styrene containing monomeric diolefinic material; heating the resulting solution in attenuated form under temperature conditions between 400 and 600° C for a period of time sufficient to effect depolymerization but not exceeding five minutes; and recovering monomeric styrene and monomeric ring substituted methyl styrene resulting from said depolymerization in admixture with said added monomeric diolefinic material and substantially less contaminated with said acetylenic material.

10. A method for purifying styrene and ring substituted methyl styrene from acetylenic material selected from the group consisting of phenyl acetylene and methyl phenyl acetylene and for producing a mixture of monomeric styrene, monomeric ring substituted methyl styrene and monomeric butadiene suitable for the production of styrene-ring substituted methyl styrene-butadiene copolymer from a mixture of styrene and ring substituted methyl styrene with unpolymerizable material contaminated with said acetylenic material which comprises polymerizing said mixture to produce a mixture of unpolymerized material and styrene-ring substituted methyl styrene copolymer; replacing said unpolymerized material with an added polymerizable solvent for said styrene-ring substituted methyl styrene polymer containing monomeric butadiene; heating the resulting solution in attenuated form under temperature conditions between 400 and 600° C. for a period of time sufficient to effect depolymerization but not exceeding five minutes; and recovering monomeric styrene and monomeric ring substituted methyl styrene resulting from said depolymerization in admixture with said added monomeric butadiene and substantially less contaminated with said acetylenic material.

11. A method for purifying styrene and ring substituted methyl styrene from acetylenic material selected from the group consisting of phenyl acetylene and methyl phenyl acetylene and for producing a mixture of monomeric styrene and monomeric ring substituted methyl styrene, and monomeric butadiene suitable for the production of styrene-ring substituted methyl styrene, and monomeric butadiene suitable for the production of styrene-ring substituted methyl styrene-butadiene copolymer from a light oil material containing styrene and ring substituted methyl styrene contaminated with acetylenic material selected from the group consisting of phenyl acetylene and methyl phenyl acetylene which comprises polymerizing said light oil material to produce a mixture of unpolymerized material and styrene-ring substituted methyl styrene copolymer; replacing said unpolymerized material with an added polymerizable solvent for said styrene-ring substituted methyl styrene polymer containing monomeric butadiene; heating the resulting solution in attenuated form under temperature conditions between 400 and 600° C. for a period of time sufficient to effect depolymerization but not exceeding five minutes; and recovering monomeric styrene and monomeric ring substituted methyl styrene resulting from said depolymerization in admixture with said added monomeric butadiene and substantially less contaminated with said acetylenic material.

12. A method for purifying styrene and ring substituted methyl styrene contained in a light oil styrene ring substituted methyl styrene fraction contaminated with acetylenic material selected from the group consisting of phenyl acetylene and methyl phenyl acetylene which comprises polymerizing said fraction to produce a mixture of unpolymerized material and styrene-ring substituted methyl styrene copolymer; replacing said unpolymerized material with an added polymerizable solvent for said styrene-ring substituted methyl styrene copolymer containing monomeric ring substituted methyl styrene; heating the resulting solution of styrene-ring substituted methyl styrene copolymer in added monomeric ring substituted methyl styrene in attenuated form under temperature conditions between 400 and 600° C. for a period of time sufficient to effect depolymerization but not exceeding one minute; and recovering monomeric styrene and monomeric ring substituted methyl styrene produced by said depolymerization in admixture with said added monomeric ring substituted methyl styrene and substantally less contaminated with acetylenic material.

13. A method for purifying styrene and ring substituted methyl styrene from acetylene material selected from the group consisting of phenyl acetylene and methyl phenyl acetylene and for producing a mixture of monomeric styrene and monomeric ring-substituted methyl styrene suitable for the production of styrene-ring-substituted methyl styrene copolymer, said styrene and ring substituted methyl styrene being contained in at least one light oil fraction contaminated with said acetylenic material which comprises polymerizing said fraction to produce a mixture of unpolymerized material and styrene-ring substituted methyl styrene copolymer; replacing said unpolymerized material with an added solvent for said styrene-ring substituted methyl styrene copolymer containing monomeric styrene; heating the resulting solution of styrene-ring substituted methyl styrene copolymer in said solvent in attenuated form under temperature conditions between 400 and 600° C. for a period of time sufficient to effect depolymerization but not exceeding one minute; and recovering monomeric styrene and monomeric ring substituted methyl styrene produced by said depolymerization in admixture with said added monomeric styrene and substantially less contaminated with said acetylenic material.

14. A method for purifying styrene and ring substituted methyl styrene from phenyl acetylene and methyl phenyl acetylene and for producing a mixture of monomeric styrene, monomeric ring substituted methyl styrene, and monomeric butadiene suitable for the production of styrene-ring substituted methyl styrene-butadiene copolymer from light oil styrene-ring substituted methyl styrene material contaminated with phenyl acetylene and methyl phenyl acetylene which comprises polymerizing said light oil material to produce a mixture of unpolymerized material and styrene-ring substituted methyl styrene copolymer; replacing said unpolymerized material with an added polymerizable solvent for said styrene-ring substituted methyl styrene copolymer containing monomeric butadiene; heating the resulting solution in attenuated form under temperature conditions between 400 and 600° C. for a period of time sufficient to effect depolymerization but not exceeding one minute; and recovering monomeric styrene and monomeric ring substituted methyl styrene resulting from said depolymerization in admixture with said added monomeric butadiene and substantially less contaminated with phenyl acetylene and methyl phenyl acetylene.

FRANK J. SODAY.